United States Patent [19]

Kromrey

[11] Patent Number: 4,839,392

[45] Date of Patent: Jun. 13, 1989

[54] METHOD FOR RECOVERING A SOLID FLOWABLE POLYMER MEDIUM

[75] Inventor: Robert V. Kromrey, Campbell, Calif.

[73] Assignee: United Technologies Corporation, Hartford, Conn.

[21] Appl. No.: 907,952

[22] Filed: Sep. 10, 1986

[51] Int. Cl.⁴ .......................... C08J 11/06; C08J 11/04
[52] U.S. Cl. .......................................... 521/45; 521/41; 528/491; 528/499; 264/37; 264/313; 264/344; 134/10
[58] Field of Search ................. 528/499, 491; 210/740; 264/36, 37, 344, 313; 521/45, 41, 47.5; 134/2, 10

[56] References Cited

U.S. PATENT DOCUMENTS

| | | | |
|---|---|---|---|
| 281,769 | 7/1883 | Kent | 521/45 X |
| 1,880,968 | 10/1932 | Mitchell | 528/499 X |
| 3,198,777 | 8/1965 | van den Berg et al. | 528/499 X |
| 3,556,201 | 1/1971 | Sander | 165/2 |
| 3,608,611 | 9/1971 | Oshima et al. | 528/499 X |
| 3,843,601 | 10/1974 | Bruner | 260/46.5 G |
| 4,073,661 | 2/1978 | Buzga et al. | 264/37 X |
| 4,167,430 | 9/1979 | Arachi | 156/212 |
| 4,264,556 | 4/1981 | Kumar et al. | 264/314 |
| 4,388,263 | 6/1983 | Prunty | 264/257 |
| 4,547,337 | 10/1985 | Rozmus | 419/49 |
| 4,581,431 | 4/1986 | Yamazaki et al. | 528/499 X |

Primary Examiner—Joseph L. Schofer
Assistant Examiner—F. M. Teskin

[57] ABSTRACT

A method of recovering a solid flowable polymer medium that is capable of being used as a pressurizing medium for high temperature molding from contaminants. A polymer mixture containing contaminants that was a solid flowable polymer medium prior to exposure to temperatures in excess of about 316° C. during its use as a pressurizing medium is disposed in a solution. The solution has a specific gravity greater than the solid flowable polymer medium. The solid flowable polymer medium is separated from the surface of the solution and contamination settles to the bottom.

7 Claims, 1 Drawing Sheet

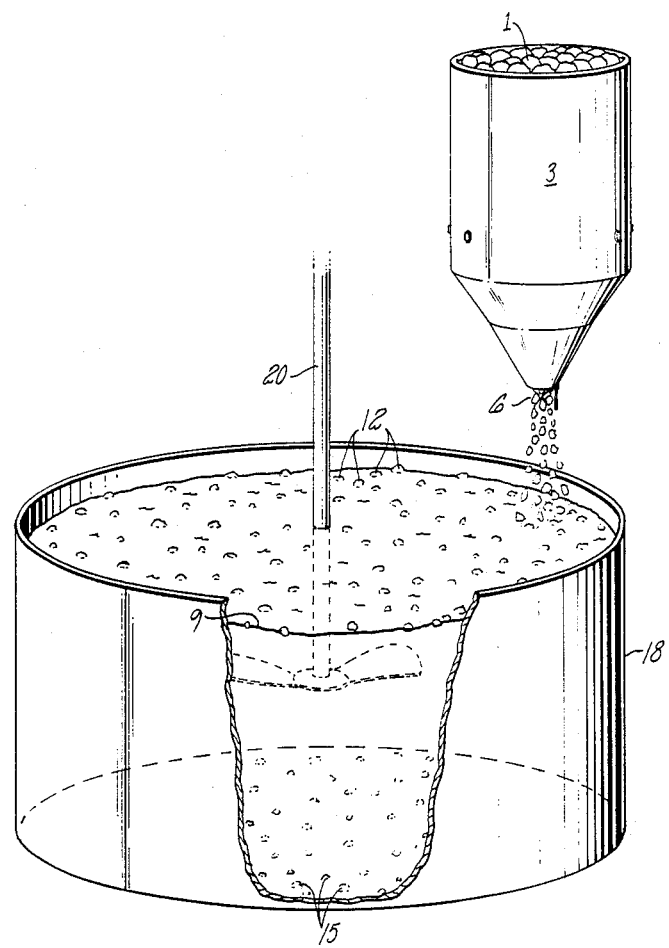

METHOD FOR RECOVERING A SOLID FLOWABLE POLYMER MEDIUM

CROSS REFERENCE

This application relates to commonly assigned copending applications Ser. No. 829,048 filed Feb. 13, 1986, entitled "Molding Method and Apparatus Using a Solid, Flowable, Polymer Medium"; and Ser. No. 907,959 entitled "Solid Flowable Polymer Molding Medium"; Ser. No. 907,943 entitled "Solid Flowable Polymer Medium with Metal Additives and Method of Molding Using Same", now U.S. Pat. No. 4,755,343; Ser. No. 907,946 entitled "High Temperature Solid Flowable Polymer Medium and Method of Molding Using Same"; Ser. No. 907,942 entitled "Method for Molding a Carbon-Carbon Composite"; Ser. No. 907,947 entitled "Method for Molding Using a Dual Solid Flowable Polymer System"; Ser. No. 907,955 entitled "Solid Flowable Medium Having a Thermal Stability Additive and Method for Molding Using Same", now U.S. Pat. No. 4,770,835; Ser. No. 907,958 entitled "Method of Vacuum Bagging Using a Solid Flowable Polymer", now U.S. Pat. No. 4,755,341; Ser. No. 907,954 entitled "Improved Method of Fabricating Tubular Composite Structures", now U.S. Pat. No. 4,704,240; and Ser. No. 907,957 entitled "Solid Flowable Polymer Medium with U.V. Detectable Additive and Method for Molding Using Same", now U.S. Pat. No. 4,772,437, filed on even date herewith, which disclose material related to that contained herein, the disclosures of which are hereby incorporated by reference.

TECHNICAL FIELD

The present invention relates to molding methods and compositions.

BACKGROUND ART

Composite materials are of great current interest because they provide a very favorable combination of high strength and low density. Typically, a composite material is comprised of fibers of graphite, boron, glass, and the like embedded within an epoxy, phenolic or other polymer resin matrix. The more advanced composites which have particularly favorable high strength to density ratio properties are especially attractive for aerospace applications. But typical of other advanced aerospace materials they present comparative processing difficulties; they cannot be made by a simple layup of the fibers and resin followed by room temperature curing. Aerospace composite materials not only involve more difficult-to-fabricate resins but often essentially defect-free finished parts must be produced. As a result, aerospace composites are typically molded and cured at elevated temperatures under substantial pressure.

One method of molding (pressure pads) comprises using shaped pads of a high thermal expansion silicone rubber. An uncured prepreg is contained within a space between abutting adjacent pads and the assembly is captured in a closely fitting closed metal vessel. The vessel and contained assembly are then heated to an elevated temperature to both cure the article and expand the rubber to apply pressure to an article during its cure. The pressure pads are also referred to as trapped rubber tooling.

Current trapped rubber molding processes use vulcanized silicone compounds which are subject to damage. If the damage is severe, or a defect is on a molding surface, the tool must be repaired or scrapped. In most instances, after a reasonable use period, the tool is either disposed or ground to small particles and reused. Quantities of the reclaimed rubber can be added to virgin liquid tooling rubber as an extender.

Acordingly, there has been continual search in this field of art for methods of reclaiming used or contaminated polymeric molding materials.

DISCLOSURE OF INVENTION

This invention is directed to a method for recovering a solid flowable polymer medium that is capable of being used as a pressurizing medium for high temperature molding from contaminants. The method comprises disposing in a solution a polymer mixture containing contaminants that was a solid flowable polymer pressurizing medium prior to exposure to temperatures in excess of about 316° C. The solution has a specific gravity greater than the solid flowable polymer medium. The solid flowable polymer medium is separated from the solution.

This invention makes a significant advance in molding technology by providing a method of recovering polymers used as a pressurizing medium.

The foregoing and other objects, features and advantages will be apparent from the specification, claims and from the accompanying drawings which will illustrate an embodiment of the invention.

BRIEF DESCRIPTION OF DRAWING

The FIGURE is a schematic representation of the recovery method of this invention.

BEST MODE FOR CARRYING OUT THE INVENTION

Subsequent to the use of a solid flowable polymer medium's use as a pressurizing medium in high temperature molding (e.g. 260° C. to about 482° C.) (as described in commonly assigned copending application entitled "Molding Method and Apparatus Using a Solid Flowable, Polymer Medium", Ser. No. 829,048, the disclosure of which is hereby incorporated by reference) portions of the polymer may be transformed (e.g. pyrolyzed) to a hardened state and even upon being ground are not flowable. By flowable is meant having a nominal flow rate of at least 0.6 gram per second (g/s) through a 1.1 centimeter (cm) diameter pipe 7.6 cm long under applied pressure as described in the above-cited application and below. In addition, some of the solid flowable polymer may revert (depolymerize) resulting in oily residue which is unsuitable as a pressurizing medium. In addition, the oily residue is very intrusive and can contaminate the article (e.g. solid polymer, composite) to be molded. Typically, these oils have a low specific gravity (low density) (e.g. lower than the solutions described below) and so they must be dissolved, emulsified or otherwise suspended and then remaining traces can be separated from the recovered polymer medium during or subsequent to its separation from the solution. This invention provides a method of separating that portion of the medium that may be reusable as a solid flowable polymer medium for molding from that portion (contaminants) which is not. In addition, contaminants is also meant to refer to the metal particles described below.

According to the FIGURE, (which depicts a schematic representation of the method herein), the used polymer medium 1 is fed into the hopper 3 where it is ground (e.g. pulverized, granulated, crushed) into small polymer particles 6. It is preferred that the particulate size is less than about −4 mesh. The smaller the particles are the more complete the cleaning or purifying is. However, a high shear blender 20 is typically used to mix the solution resulting in suitable particle breakup. The small particles are disposed in an aqueous solution 9. A high shear mixer 20 disintegrates the particles and emulsifies the free silicone oils. The mixer is stopped and by virtue of the differential specific gravities of the aqueous solution 9 (preferably having detergents and emulsifiers) contaminants (e.g. hardened polymer) 15, and flowable polymer 12, the flowable polymer 12 floats while the contaminants (e.g. hardened polymer and foreign matter) 15 sink. The flowable polymer 12 is then preferably immediately separated from the mixture 18 by conventional means (e.g. skimming). Then it is rinsed in a neutralizing solution such as a dilute acid (in order to remove alkaline components, if present) followed by several aqueous rinses and dried. It is preferred to rinse the polymer to remove the salts and any traces of emulsified oil and it is preferred to dry the polymer because any solvent remaining may cause defects (e.g. voids, hydrolytic decomposition during subsequent uses), etc.

The particular polymeric medium useful in the present invention is critical. Its responsiveness to temperature and pressure coupled with its flowability and solid nature at molding temperatures enable it to be useful. These properties cause the medium to produce an advantageous, substantially uniform, controllable pressure on the surface of the article precursor to be molded. In a typical embodiment of the invention, the polymer is an unfilled silicone rubber particulate of −4+30 U.S. mesh sieve size (4.7–0.42 millimeter (mm)), which when pressurized, is sufficiently self-compliant to coalesce as an essentially void-free medium at a pressure of the order of 69 kPa (10 psi).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. A preferred material which has been used thus far is the experimental unfilled silicone rubber material designated as X5-8017, formerly No. 6360 81 (more simply 8017 hereinafter), by the Dow Corning Corporation (Midland, Mich.).

Another Dow Corning silicone rubber, No. 93–104, without its ordinary fillers (called "93-104" herein, nonetheless) is useful. The Polygel C-1200 silicone rubber (Stauffer Chemical Company, Westport, Conn. U.S.A.), believed to be essentially the material which is described in the Bruner Pat. No. 3,843,601 is also useful with the present invention.

Other preferred materials are the vinylmethylsiloxane-dimethylsiloxane (VMS-DMS) polymers such as Dow Corning No. X5-8026 as described in commonly assigned copending application Ser. No. 907,946 entitled "High Temperature Solid Flowable Polymer Medium and Method of Molding Using the Same", the disclosure of which is hereby incorporated by reference as it is usable at high temperatures, (e.g. 316° C. (600° F.), 482° C. (900° F.)).

While the preferred materials are silicone rubbers, other polymer materials having the desired characteristics can be used. Most silicone rubbers are temperature limited for long term use, e.g. typically up to about 232° C. (450° F.). However, silicone resins of the vinylmethylsiloxane and silphenylene types have been successfully tested up to about 482° C. (900° F.). Fillers and other adulterants (such as the metal particulates described below) can be included with and within the medium, provided the essential behavior properties are maintained.

Thermally conductive particulate additives are sometimes used in moldings with the solid, flowable polymer to increase the heat transfer within the polymer itself and to the article to be molded. This is described in commonly assigned copending application Ser. No. 907,943 entitled "Solid Flowable Polymer Medium with Metal Additives and Method of Molding Using the Same", the disclosure of which is hereby incorporated by reference. These additives comprise particulate metal. By thermally conductive is meant having a conductivity typical of metals and alloys which is greater than that of organic materials. By particulate is meant particles less than about (0.5 mm) in size. These sizes enable the metal to mix with the polymer so as to provide a uniform mixture. This aids in increasing the heat transfer as the heat transferring metal is distributed throughout the mixture. It is especially preferred that the particulate metal is about 0.005 mm to about 0.5 mm. If the particles are below about 0.005 mm in size, they may tend to oxidize rapidly. In addition, it is preferred that the particles are smaller or equal to the average size of the polymer particles in order that the molten metal can flow around the polymer particle and join with other metal particles. Larger sizes will remain as discrete particles and that will reduce conductivity as they may not contact one another.

Virtually any metal or combination (e.g. alloy) can be used that has a melting point less than about the temperature the article is to be molded at. The melting point of the metal is preferably low enough to allow flow of the medium during the initial preforming cycles and during the temperature ramping cycles. This is critical because the metal particulate should not provide structure to the polymer metal mixture medium during molding. This would detract from the flowable nature of the medium which is critical to the invention as described below. In fact, in the molten state, the metal tends to act as a lubricant between the individual polymer particles and at the least, does not inhibit the medium flow. Preferred alloys comprising lead, tin, zinc and bismuth actually enhance the flowable nature of the medium. Thus, the heat transfer nature of the polymer is improved without loss of flow properties. Typically, the melting point is below about 232° C. (450° F.) as above that temperature, the metal will provide too much structure during the initial preforming and curing stages. Of course this will vary with the molding temperature required to mold an article. For example, in molding 177° C. (350° F.) epoxy resins, the melting point is preferably below about 121° C. (250° F.). For polyimide resins cured at 316° C. (600° F.), the metal preferably melts at or below approximately 171° C. (340° F.).

It is believed the molten metal conforms to the irregular surface of the particulate polymer medium. This results in a continuous film of metal surrounding every polymer particle thereby enhancing thermal conductivity. It is believed that the metal-medium mixture when hot, is more mobile than the properties of the medium alone in the cold state.

The metal or alloy chosen is also substantially chemically compatible with the polymer chosen. By substantially chemically compatible is meant that it does not cause reversion (breakdown) or decomposition of more than abut 10% of the polymer medium under the molding temperature used. Reversion refers to the "depolymerization" of the medium to an oily viscous liquid medium. If the metal is not chemically compatible, excessive destruction of the medium may occur.

In addition, it is preferred that the metal or alloy chosen has high thermal conductivity, a low specific heat, a low density, a low melt viscosity and a low surface tension as this combination of properties provides the most desirable molding medium.

It is preferred that the particulate metal comprises eutectic alloys. Preferred materials include those described in the Table below, however, there are generally many alloys of copper, lead, tin and bismuth that are believed suitable. Many of the pure metals are available from Atlantic Equipment Engineers (Bergenfield, N.J.).

TABLE

Metal Matrices

| | Melting Point | Elements | Ratios |
|---|---|---|---|
| Ternary Eutectic | 95° C. | Bi, Pb, Sn | 52.5:32:15.5 |
| Roses Metal | 109° C. | Bi, Pb, Sn | 50:28:22 |
| Ternary Eutectic | 130° C. | Bi, Sn, Zn | 56:40:4 |
| Binary Eutectic | 140° C. | Bi, Sn | 58:42 |
| Eutectic Solder | 183° C. | Sn, Pb | 63:37 |
| Binary Eutectic | 198° C. | Sn, Zn | 96.5:3.5 |

It is preferred that the mixture of polymer and particulate metal comprises about 20% to about 90% polymer and about 10% to about 80% particulate metal. This is because above about 90% excess metal will squeeze out of the polymer and below about 10%, there will be insufficient metal to form the continuous layer necessary for improved heat transfer. The density of the metal used will also affect the degree of "squeeze out". The percentage of metal is dependent on molding pressure as higher pressures tend to squeeze the metal into thinner layers around the polymer particles. Also, the higher the specific gravity of the metal, the more the metal will tend to stratify, which is not desired. It is especially preferred that if the polymer is the Bi-Pb-Sn ternary eutectic described in the Table above the particulate metal mixture comprises about 25% to about 40% polymer and about 60% to about 75% particulate metal. The ternary eutectic is useful for low temperature composites (e.g. up to 232° C. (450° F.)). Another preferred material is the eutectic solder described above as it is useful for higher temperatures (e.g. 316° C. (600° F.)-399° C. (750° F.). Although the mixture has been described in terms of percentage compositions, mixtures that vary from these but provide the advantages are described herein may be used.

Having described the metal particles and the proportion of metal-polymer particles, the pressurizing medium that is recovered in this invention is further described below.

The preferred 8017 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50–55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also been observed that preferred polymer useful with the present invention forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on 40 mesh.

The aforementioned behavior of the polymer media enables the fabrication of intricately shaped composite polymer parts with uniform properties under the controlled and independent application of uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present mediums from those which have been used heretofore in the pressure pad molding technique. The flowability property can inferentially be seen to be analogous to viscosity. But there is no evident standard test known for measuring this property of importance to the invention and therefore a test apparatus was created as described above comprised of a cylinder having a downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32–64 RMS (root mean square) surface finish. The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MPa (1500 psi) and a 15.2 cm (6 inch) pipe, has a flow rate of at least 0.6 g/s, typically 6 g/s, and desirably more than 25 g/s.

Further description of the polymer is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. With the addition of a eutectic alloy (or metal), the alloy fuses and conforms to the particle shape. Because of this and their inherent resilience, a uniform hydraulic-like pressure is applied to the article precursor surface. Tests show that the 6360 material without the metal additive will tend to coalesce upon the application of moderate compressive pressure, of the order of 70 kPa; at this point the interfacial boundaries between the particles are so essentially conformed that the compressed rubber becomes translucent instead of opaque. The 8017 material has a true density of 0.97 g/cc, an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with mediums having low strength, the ability to self-comply under molding level pressures, and the ability to flow and exhibit hydraulic-like behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%. Addition of molten metal matrices does not adversely affect the above-cited property.

The usefulness of the materials is also evaluated according to the integrity of a molded finished product, it being well established that inspection will commonly show areas of low density or cracking where the proper application of pressure and temperature has not been achieved, during either the heating or cooling cycle.

The polymer (and metal mixtures) have only been characterized according to the properties of some currently available materials; the data are insufficient to establish that the totality of measured properties in combination are necessary. On the contrary, to a significant extent it is believed there is a redundancy and that they independently chracterize the invention.

The solution in which the polymer is disposed is critical to the invention. Solution as referred to in this application also includes emulsion, dispersion, suspension and colloidal dispersion, etc., in addition to a solution in the classical sense of the term. The solution must be subtantially chemically compatible with the polymer medium that is to be recovered in order that it not act on the medium so that it can't be reused. By substantially chemically compatible is meant does not act on the polymer medium in a manner that the polymer medium does not retain the desirable properties described above. The solution should have a specific gravity greater than the solid flowable polymer medium that is to be recovered. The greater specific gravity of the solution will enable the reusable polymer to be separated from the top of the solution. The solution should also have a specific gravity less than the specific gravity of the polymer mixture (and/or particulate metal) that is no longer usable for the molding processes for which these solid flowable polymers are particularly adapted. This allows the separation of the particles where the specific gravity of the solution is less than the particles since they sink to the bottom. It is preferred that the specific gravity is above about 1 because the specific gravity of the polymer media is about 0.97 and below about 1.1 because otherwise degraded material would tend to float and be recovered with the good media. Examples include water, chlorinated hydrocarbons, freon, aromatic hydrocarbons. Of course these may have to be mixed to yield the desired specific gravity.

When particulate metal is used in the medium it is preferred, if possible, that the cleaning solution be conducted at a higher temperature than the melting point of the metal. This can be accomplished using a cleaning solution that has a boiling point higher than the metal melting point. Alternatively, pressure can be used. It is believed the metal during use tends to flow around the polymer particles so if the metal is heated above its melting point it assumes a near spherical shape and loses its mechanical attachment to the polymer particle.

It is especially preferred that the solution is an aqueous solution as this provides excellent separation and yet is readily available, inexpensive, can be recovered and poses no environmental hazard. Most importantly, water is chemically compatible with the polymer medium and can be easily removed by drying. It is also preferred that the solution comprises a surfactant (e.g. detergent) as this aids in cleansing (purifying) the polymer medium from any undesirable materials such as oils, dirts, etc. It also decreases the surface tension resulting in better cleaning. The oils are typically the reversion products from the polymer medium as it depolymerizes under pressure and temperature. These oils are particularly detrimental to the medium as they aren't chemically compatible with conventional composite prepregs and also they can cause problems with the molding apparatus. These contaminants (reversion oils) that have a lower specific gravity than the solution can be separated. These emulsified oil products can be removed by rinsing. Alternatively, solvent(s) can be used that will dissolve the depolymerized oils (reversion products) that might otherwise float and mix with (contaminate) the flowable polymer. Even a combination of immiscible solvents that have different specific gravities yet are within the desired range of specific gravities may be used as the "solution" to advantage. For example, a combination of hexane and freon as the desired solution will have the desired specific gravity and solvency.

As previously stated, it is preferred to rinse the flowable polymer subsequent to its separation from the "solution". In this manner, any dissolved or emulsified oils can be removed.

Subsequent to rinsing, it is preferred to dry the recovered solid flowable polymer thoroughly because moisture reduces the high temperature utility of the medium. The drying can be accomplished either by heat (e.g. 104° C. (220° F.) to 177° C. (350° F.), flowing gases, vacuum, or even chemically compatible drying solvents and absorbents such as anhydrous alcohol. It is preferred to use heat because it is economical and effective.

EXAMPLE

Used X5-8026 pressurization medium that had been exposed to temperatures in excess of 900° F. was ground through a 30 mesh screen to pulverize large agglomerates. The pulverized medium was mixed in a 140° F. alkaline cleaning solution (Lab Detergent Concentrate C-628681, Scientific Products, McGraw Park, Ill.) in a high speed blender. The material was mixed under high shear conditions for approximately two minutes. After stopping the mixer, the solution was allowed to set. After about one minute, the floating material was skimmed from the surface yielding a clean polymer medium. Then the product was rinsed with water and dried at approximately 104° C. The detergent solution containing contaminants and reversion products was discarded. The dried polymer medium was then ready for reuse.

This invention provides an efficient, inexpensive, accurate, method of recovering solid flowable polymer used in high temperature, high pressure molding so that it can be reused. Recovered media, even if partially degraded, can be added to new polymer medium. In particular, the medium nearest the article being molded may become severely degraded. However, typically for a distance of about 0.7 cm from the surface, the medium is fully functional. In this instance, recovery of more than 90% of the costly high temperature medium is practical. This process separates the medium from a variety of contaminants including reversion products, pyrolyzed resins, casual soil, metals, processing materials (e.g. aluminum foil and glass fabric scraps).

It should be understood that the invention is not limited to the particular embodiment shown and described herein, but that various changes and modifications may be made without departing from the spirit or scope of this concept as defined by the following claims.

I claim:

1. A method for recovering a polymer medium that is particularly adapted for high temperature high pressure molding comprising:

(a) molding an article by causing a particulate silicone rubber, having a nominal flow rate of at least 0.6 gram per second through a 1.1 centimeter diameter pipe 7.6 centimeters long under applied pressure of 10.3 MPa, to apply pressure to the article wherein said silicone rubber is exposed to temperatures in excess of about 316° C. causing contaminants including contaminant oils to form, resulting in a polymer mixture comprising said particulate silicone rubber;
    (b) grinding said polymer mixture;
    (c) disposing said ground polymer mixture in a solution, said solution having a specific gravity greater than said silicone rubber and containing surfactants, emulsifiers and detergents;
    (d) mixing said polymer mixture containing solution to emulsify the contaminant oils, said oils having a density less than that of said solution;
    (e) separating the particulate silicone rubber from the solution; and
    (f) rinsing the particulate silicone rubber to remove the emulsified oils;
    wherein said recovered silicone rubber is capable of being used as a pressurizing medium for high temperature molding.

2. The method for recovering a polymer medium as recited in claim 1 wherein said solution comprises an aqueous solution.

3. The method for recovering a polymer medium as recited in claim 1 wherein said polymer mixture is ground to a particulate size less than about −4 mesh.

4. The method for recovering a polymer medium as recited in claim 1 wherein said polymer mixture comprises particulate metal.

5. The method for recovering a polymer medium as recited in claim 4 wherein the solution is mixed at a higher temperature than the melting point of the metal.

6. The method for recovering a polymer medium as recited in claim 1 wherein said particulate silicone rubber is dried subsequent to rinsing.

7. The method for recovering a polymer medium as recited in claim 1 wherein contaminants having a lower specific gravity than said solution are separated from said recovered silicone rubber.

* * * * *